United States Patent [19]
Hasebe

[11] Patent Number: 5,581,418
[45] Date of Patent: Dec. 3, 1996

[54] MAGNETIC DISK DRIVE UNIT CAPABLE OF DETERMINING DATA REGION POSITION OF DATA REGION THAT DOES NOT INCLUDE POSITION IDENTIFICATION DATA

[75] Inventor: Masahiro Hasebe, Kawasaki, Japan

[73] Assignee: Fujitsu Limited, Japan

[21] Appl. No.: 348,538

[22] Filed: Dec. 1, 1994

[30] Foreign Application Priority Data

Mar. 15, 1994 [JP] Japan .................................. 6-043871

[51] Int. Cl.⁶ ....................................................... G11B 5/09
[52] U.S. Cl. ...................... 360/51; 360/77.08; 360/78.14
[58] Field of Search ............................ 360/48, 51, 77.08, 360/78.14

[56] References Cited

U.S. PATENT DOCUMENTS

| | | | |
|---|---|---|---|
| 4,879,612 | 11/1989 | Freeze et al. | 360/78.06 |
| 5,274,509 | 12/1993 | Buch | 360/51 X |

FOREIGN PATENT DOCUMENTS

| | | |
|---|---|---|
| 64-21773 | 1/1989 | Japan . |
| 1-196768 | 8/1989 | Japan . |
| 2-118975 | 5/1990 | Japan . |
| 4-23279 | 1/1992 | Japan . |
| 4-98661 | 3/1992 | Japan . |
| 4-313866 | 11/1992 | Japan . |

*Primary Examiner*—W. Chris Kim
*Attorney, Agent, or Firm*—Greer, Burns & Crain, Ltd.

[57] ABSTRACT

A magnetic disk drive unit using a data surface servo system includes: at least one magnetic disk having a data surface, wherein a region in which servo information including a servo address for use in positioning a head is written and a succeeding data region are arranged alternately on each of a plurality of tracks sectored radially; a magnetic head used for recording or reproducing data and positioned facing the data surface; a modulating/demodulating unit for modulating a write data to thereby supply the modulated data as a record signal to a magnetic head, and for demodulating a signal reproduced by the magnetic head to thereby output the demodulated signal as read data to the magnetic head; and a read/write control unit for controlling a read/write processing of data for the magnetic disk using the magnetic head and the modulating/demodulating unit. The servo address is composed of a cylinder address indicating a cylinder associated with a corresponding one of the plurality of tracks and a sector address indicating a corresponding one of a plurality of sectors sectioned along the circumference of the magnetic disk. The read/write control unit includes a unit for detecting a servo address included in the servo information, and a unit for determining a position of a target data region according to the detected servo address, and executes a read/write processing of data for the determined data region. This configuration enables a relative increase in storage capacity without any change in recording density.

4 Claims, 12 Drawing Sheets

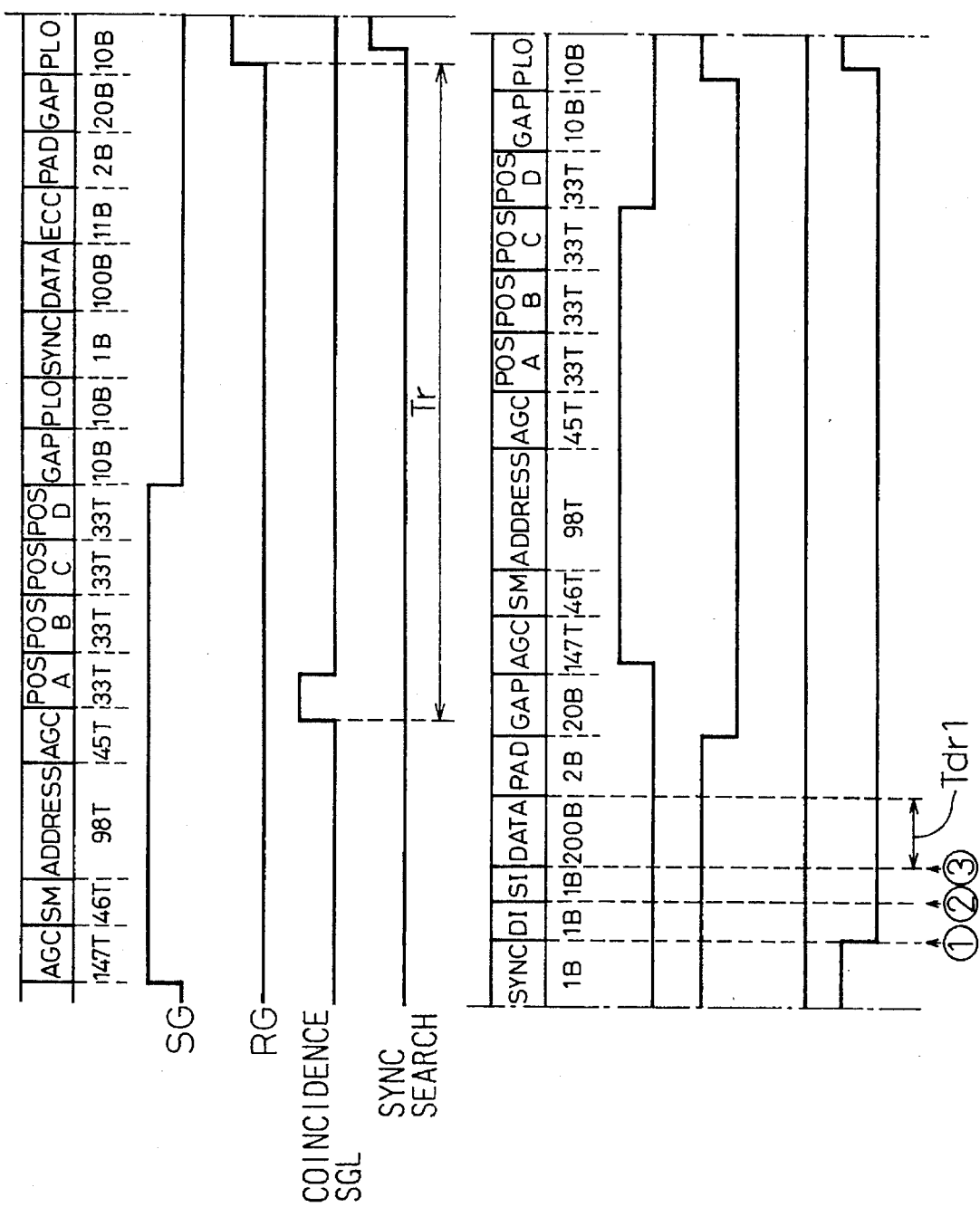

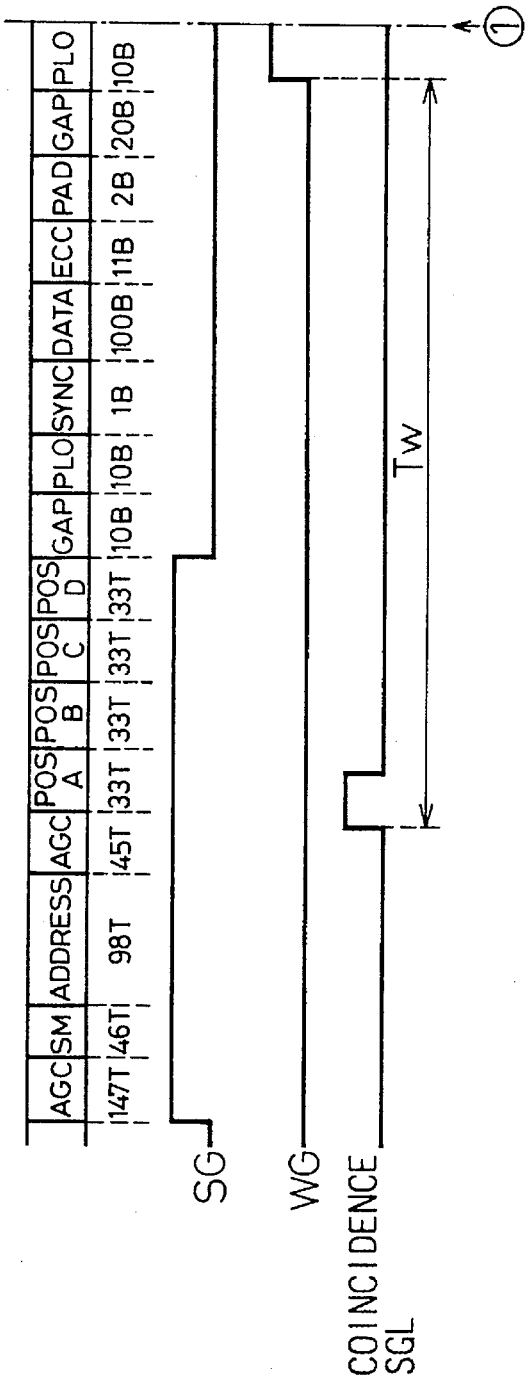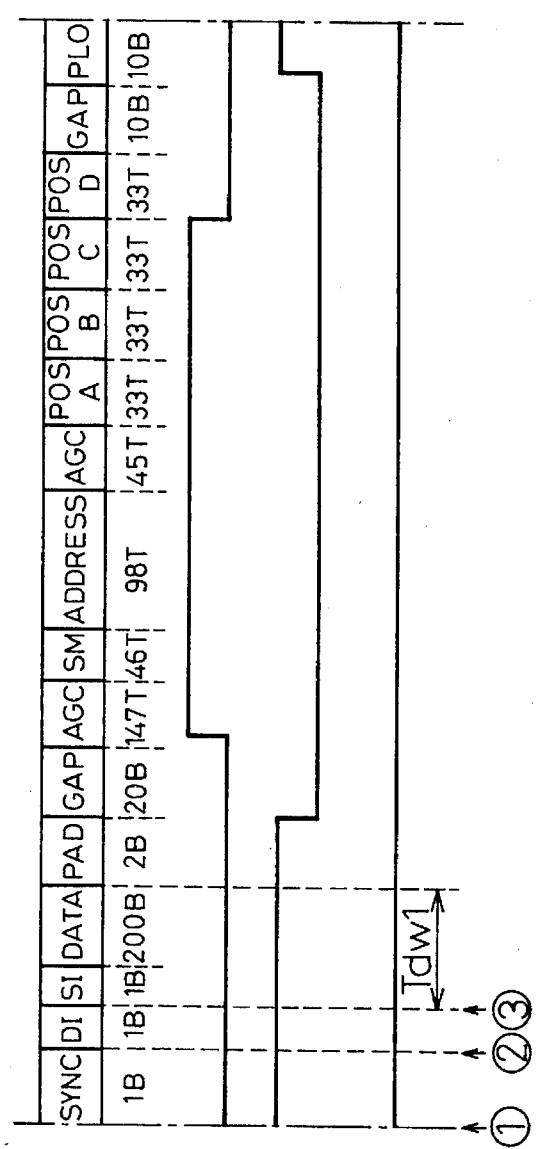
Fig. 6a
Fig. 6b

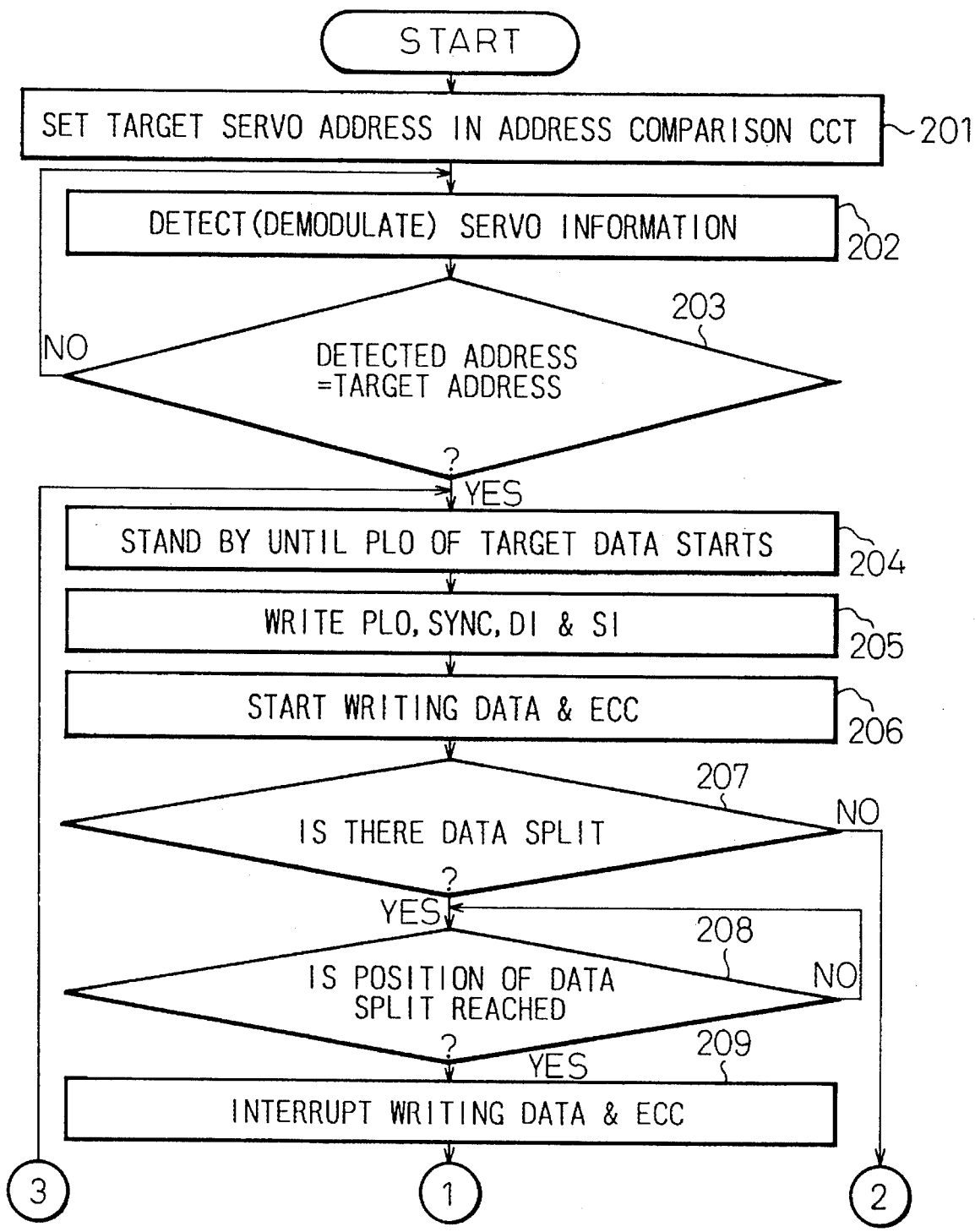

MAGNETIC DISK DRIVE UNIT CAPABLE OF DETERMINING DATA REGION POSITION OF DATA REGION THAT DOES NOT INCLUDE POSITION IDENTIFICATION DATA

BACKGROUND OF THE INVENTION

1. Field of the Invention

The present invention relates to a magnetic disk drive unit. More particularly, this invention is concerned with an art of determining a position of a data region on a data surface in a magnetic disk drive unit using a data surface servo system.

2. Description of the Related Art

In a conventionally known magnetic disk drive unit using a data surface servo system, tracks (tracks with the same distance from the axis about which a disk rotates is regarded as a cylinder) are formed circumferentially on a data surface of a magnetic disk. Each track is composed of a plurality of sectors (servo sectors). Each sector is composed of a region in which servo information is recorded and a data region succeeding the region in which servo information is recorded and containing data identification (ID). Servo information includes a servo address for use in positioning a head and a burst signal. The servo address is composed of data representing a track number in which a sector concerned exists and data representing the sector number. The data ID includes address information indicating a position of a data region (that is, data indicating a track number and a sector number which specify a sector concerned). In other words, the servo address and the data ID have mutually similar address information.

In execution of read/write processings for a data region on a data surface having the foregoing data structure, a data ID preceding the data region must be interpreted in order to determine the position of the data region.

In recent years, constant density recording has been adopted in an effort to increase storage capacity. In constant density recording, the number of data sectors (comparable to data regions) per track is changed between an outer circumference of a magnetic disk and an inner circumference thereof in order to ensure constant recording density for the whole of the magnetic disk. This poses a drawback in that a data sector may stay over two adjoining servo sectors on the same track; that is, what is referred to as "data split" may occur.

In a conventional magnetic disk drive unit, reading or writing is controlled by appending split information to the aforesaid data ID. The data ID contains not only address information indicating a position of a data region and split information but also defect information indicating presence or absence of a defect in the data region. The defect information is used to replace a defective data region by an indefectible data region.

As mentioned above, as long as a conventional magnetic disk drive unit using a data surface servo system is concerned, servo address for use in positioning a head on a desired track and data ID for use in identifying a data region have mutually identical address information. In other words, the same address information (data indicating a track number and a sector number) is duplicated.

If one of duplicated address information contained in servo information can be omitted, a region from which the address information is omitted can be used to record extra data. This is preferable from the viewpoint of storage capacity.

SUMMARY OF THE INVENTION

An object of the present invention is to provide a magnetic disk drive unit using a data surface servo system by which storage capacity can be increased relatively without changing recording density.

The present invention makes it possible to determine a position of a target data sector (corresponding to a data region) despite omission of data ID that has been conventionally contained together with servo data in a servo information, and to execute data reading or writing on the basis of the servo information.

According to the present invention, there is provided a magnetic disk drive unit using a data surface servo system, comprising: at least one magnetic disk having a data surface, a region in which servo information including a servo address for use in positioning a head is written and a succeeding data region being arranged alternately on each of a plurality of tracks sectored radially on said data surface; a magnetic head positioned facing the data surface and used for recording or reproducing; a modulating/demodulating means for modulating a write data to thereby supply the modulated data as a record signal to said magnetic disk, and for demodulating a signal reproduced by said magnetic heat to thereby output the demodulated signal as read data; and a read/write control means for controlling reading or writing for said magnetic disk using said magnetic head and the modulating/demodulating means; said servo address being composed of a cylinder address indicating a cylinder associated with a corresponding one of said plurality of tracks and a sector address indicating a corresponding one of a plurality of sectors sectioned along the circumference of said magnetic disk; and said read/write control means including means for detecting a servo address included in the servo information, and means for determining a position of a target data region according to said detected servo address, and executing data reading or writing for said determined data region.

BRIEF DESCRIPTION OF THE DRAWINGS

Other objects and features of the present invention will be described hereinafter in detail by way of preferred embodiments with reference to the accompanying drawings, in which:

FIGS. 5a to 5c are diagrams showing a data structure of the portion P shown in FIG. 4 in enlarged scale on a time-sequential basis together with various control signals for use in reading data;

FIGS. 6a to 6c are diagrams showing a data structure of the portion P shown in FIG. 4 in enlarged scale on a time-sequential basis together with various control signals for use in writing data;

FIGS. 8a and 8b are flowcharts showing an example of writing to be executed by the unit shown in FIG. 2.

DESCRIPTION OF THE PREFERRED EMBODIMENTS

Figure 1A:
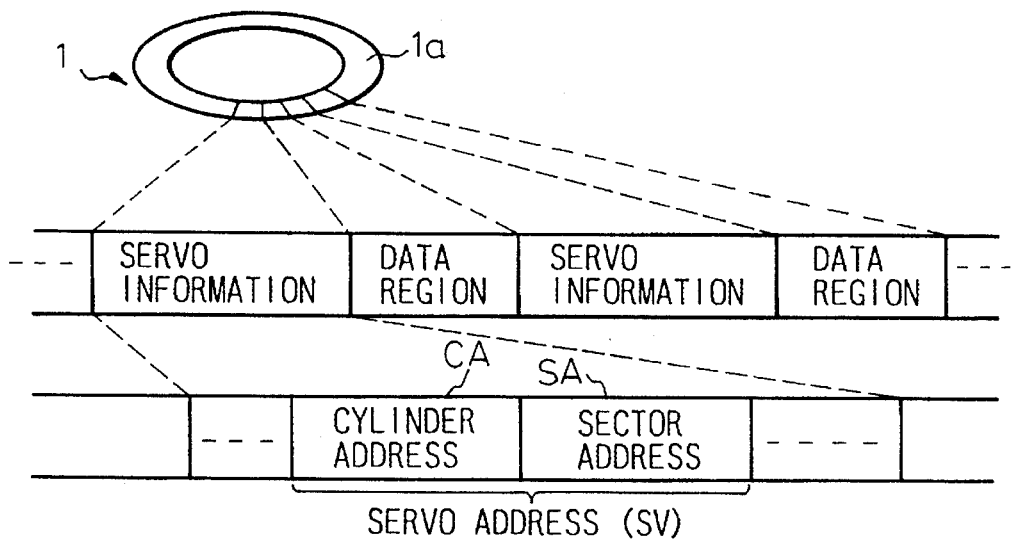
FIGS. 1a and 1b are explanatory diagrams of the principle of a magnetic disk drive unit using a data surface servo system in accordance with the present invention.
Figure 1B:
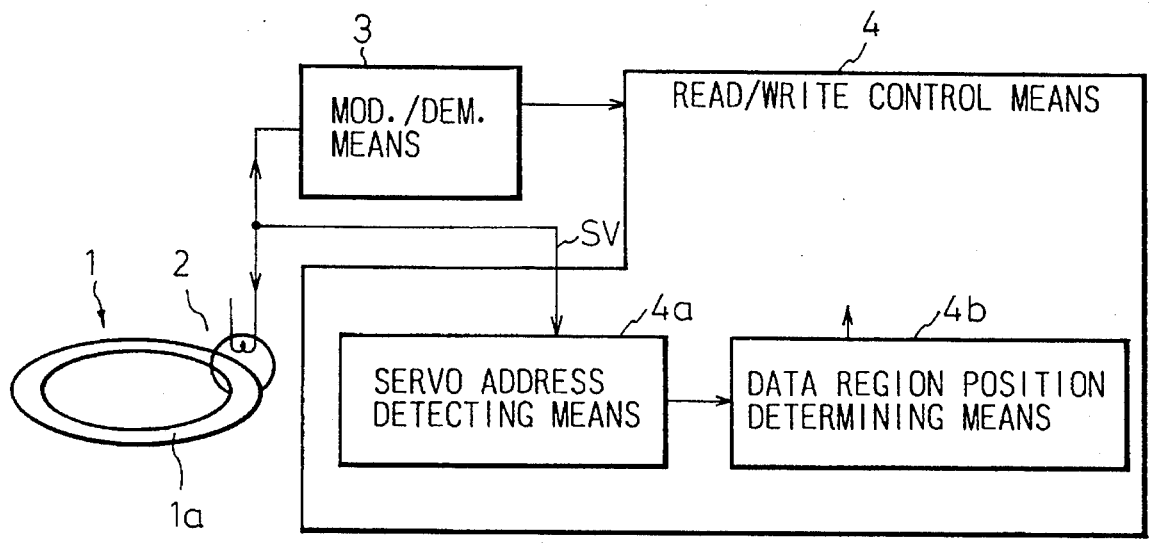

FIGS. 1a and 1b show the principle and configuration of a magnetic disk drive unit using a data surface servo system in accordance with the present invention.

The unit illustrated comprises data surfaces 1a each of which is formed on a plurality of tracks sectored in a radial direction of a magnetic disk 1 and on each of which a region in which servo information including a servo address SV for use in positioning a head is written and a region succeeding the region in which servo information is written are arranged alternately, magnetic heads 2 each positioned on the opposite side of a data surface and used for recording or reproducing data, a modulating/demodulating means 3 for modulating write data and supplying modulated data as a record signal to an magnetic head or for demodulating a signal reproduced by a magnetic head and supplying a demodulated signal as read data, and a read/write control means 4 for controlling reading or writing of data from or into a magnetic disk using the magnetic head and modulating/demodulating means.

The servo address SV consists of a cylinder address CA indicating a cylinder associated with any of the plurality of tracks and a sector address SA indicating any of a plurality of sectors defined along the circumference of a magnetic disk. The read/write control means includes a means 4a for detecting a servo address in servo information and a means 4b for determining a position of an intended data region according to a detected servo address. The read/write control means 4 executes data reading or writing at a located data region.

According to the foregoing configuration, a position of a data region succeeding servo information, which includes a servo address, is determined according to the servo address SV made up of a cylinder address CA and a sector address SA. For reading or writing any data region on a data surface la, a position of a data region succeeding a servo address SV can be specified by checking the servo address SV for use in positioning a magnetic head 2 on an associated track.

This obviates the necessity of data ID that has been appended to the start of a data region in a conventional unit. The region allocated to the data ID can therefore be utilized as a data region. That is to say, storage capacity can be increased relatively without any change in recording density.

Next, a preferred embodiment of the present invention will be described with reference to FIGS. 2 to 8b.

Figure 2:
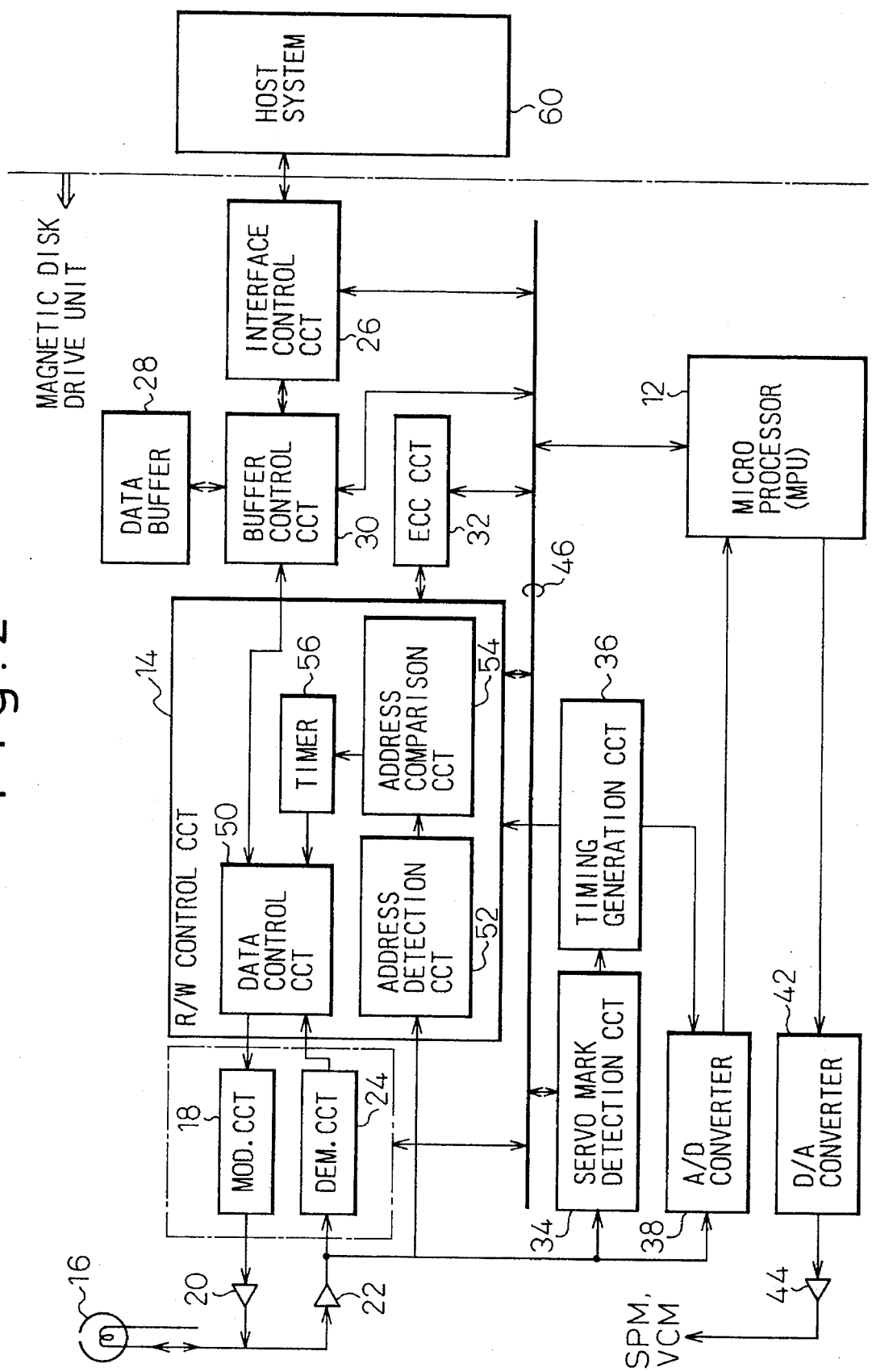
FIG. 2 is a block diagram showing an overall configuration of a magnetic disk drive unit using a data surface servo system in accordance with an embodiment of the present invention.

FIG. 2 shows an overall configuration of a magnetic disk drive unit using a data surface servo system in accordance with an embodiment of the present invention.

Prior to a configuration of a magnetic disk drive unit in accordance with this embodiment, a data structure on a data surface of a magnetic disk employed in this embodiment will be described with reference to FIGS. 4 to 6c.

Figure 4:
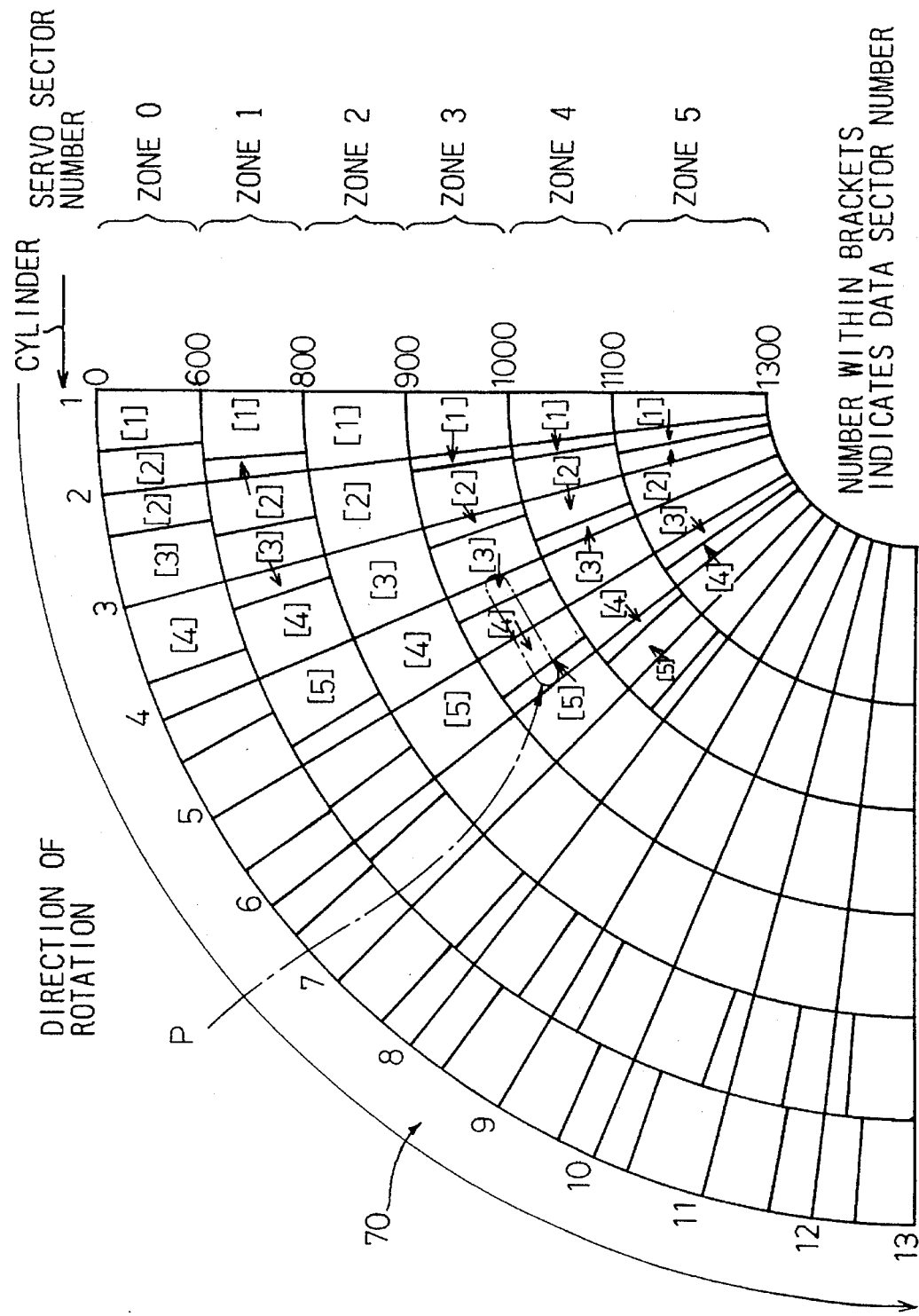
FIG. 4 is an explanatory diagram of a data structure for a data surface of a magnetic disk employed in the embodiment shown in FIG. 2.

Referring to FIG. 4, it is seen that a magnetic disk 70 (only a quarter of a whole data surface is shown) employed in this embodiment is segmented into six zones 0 to 5 (the number of cylinders is 1300) in a radial direction and into 48 sectors (the number of servo sectors is 48) in a circumferential direction. The data structure illustrated has been defined on the assumption of constant density recording.

Figure 5C:
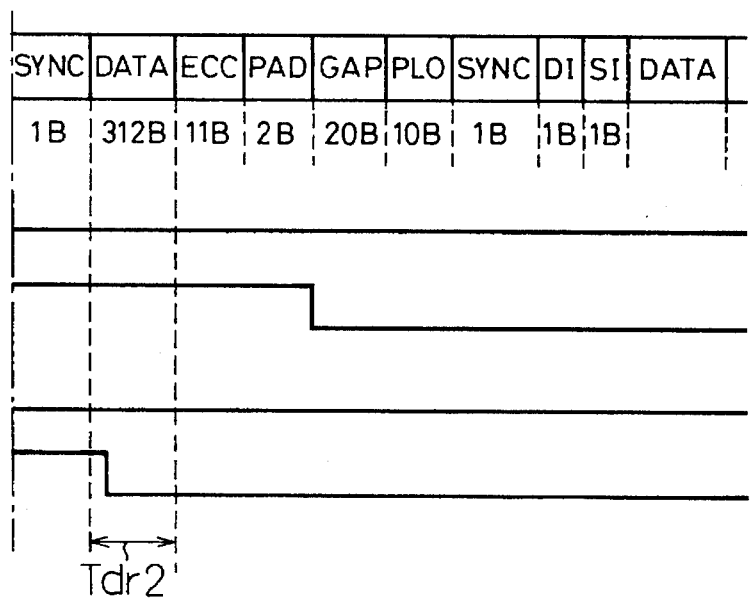
Figure 6C:
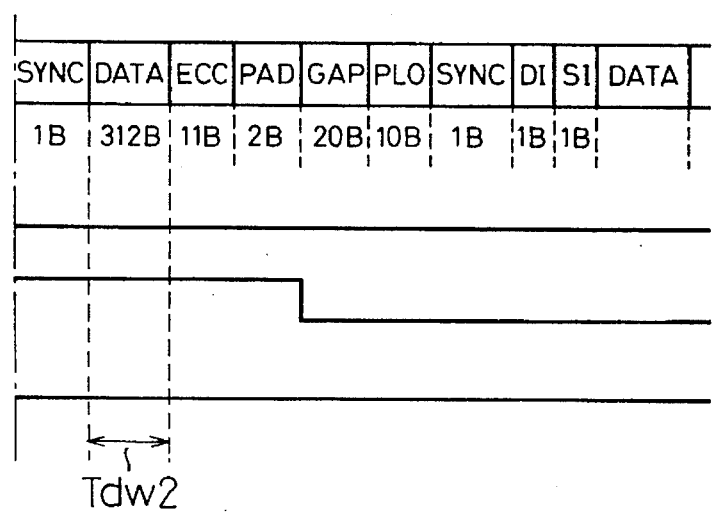
Figure 7A:
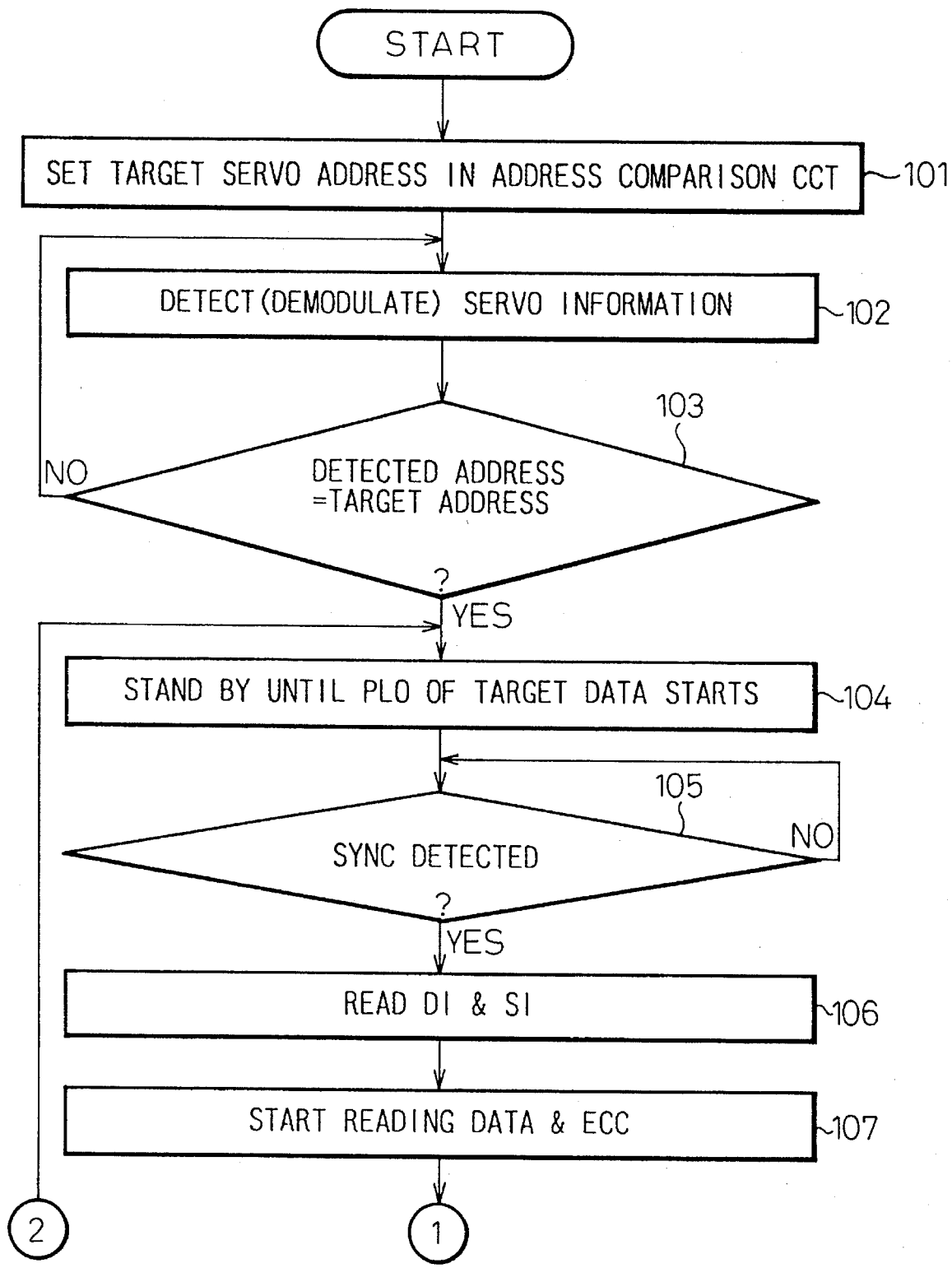
FIGS. 7a and 7b are flowcharts showing an example of reading to be executed by the unit shown in FIG. 2.
Figure 7B:
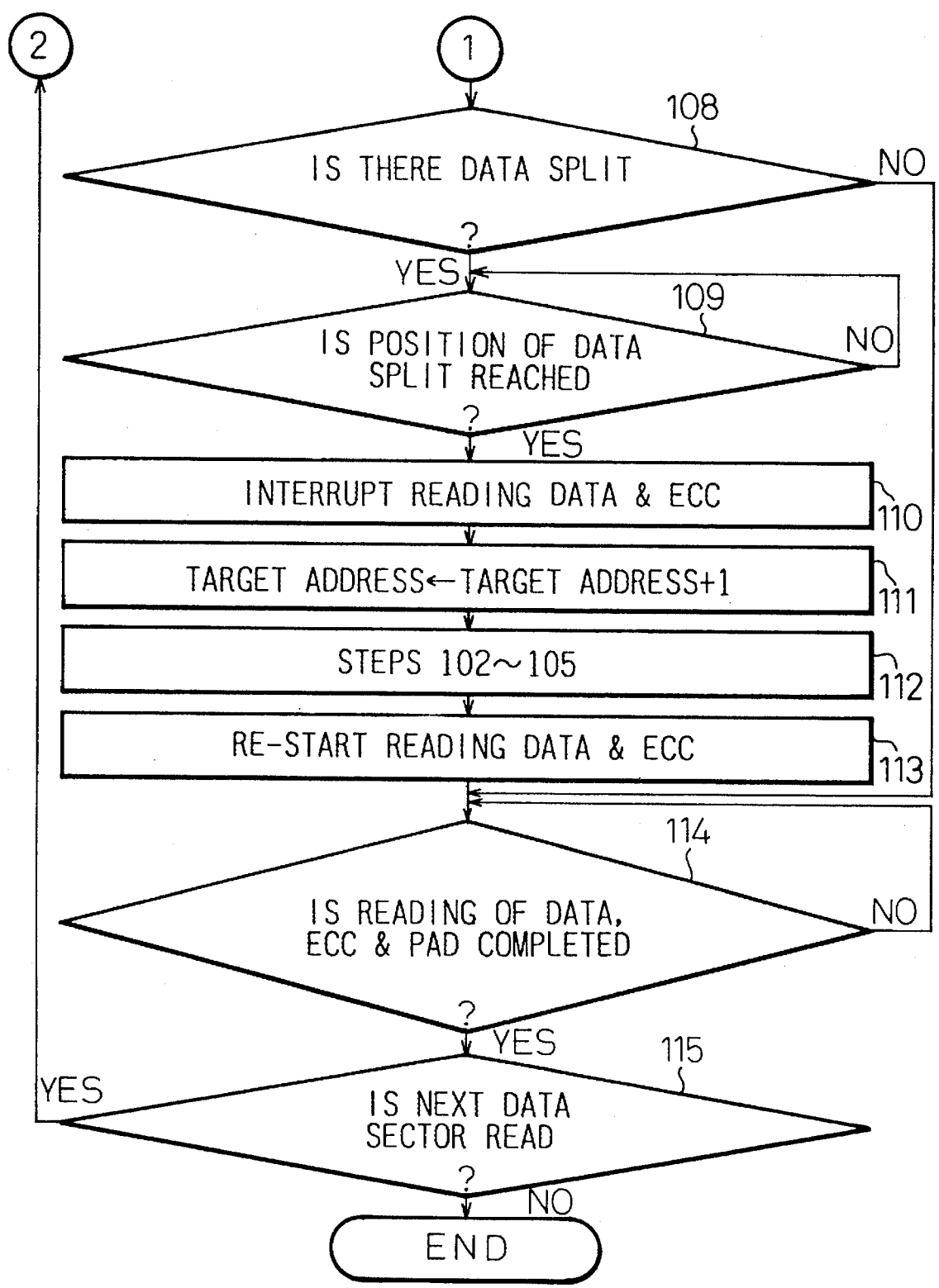
Figure 8B:
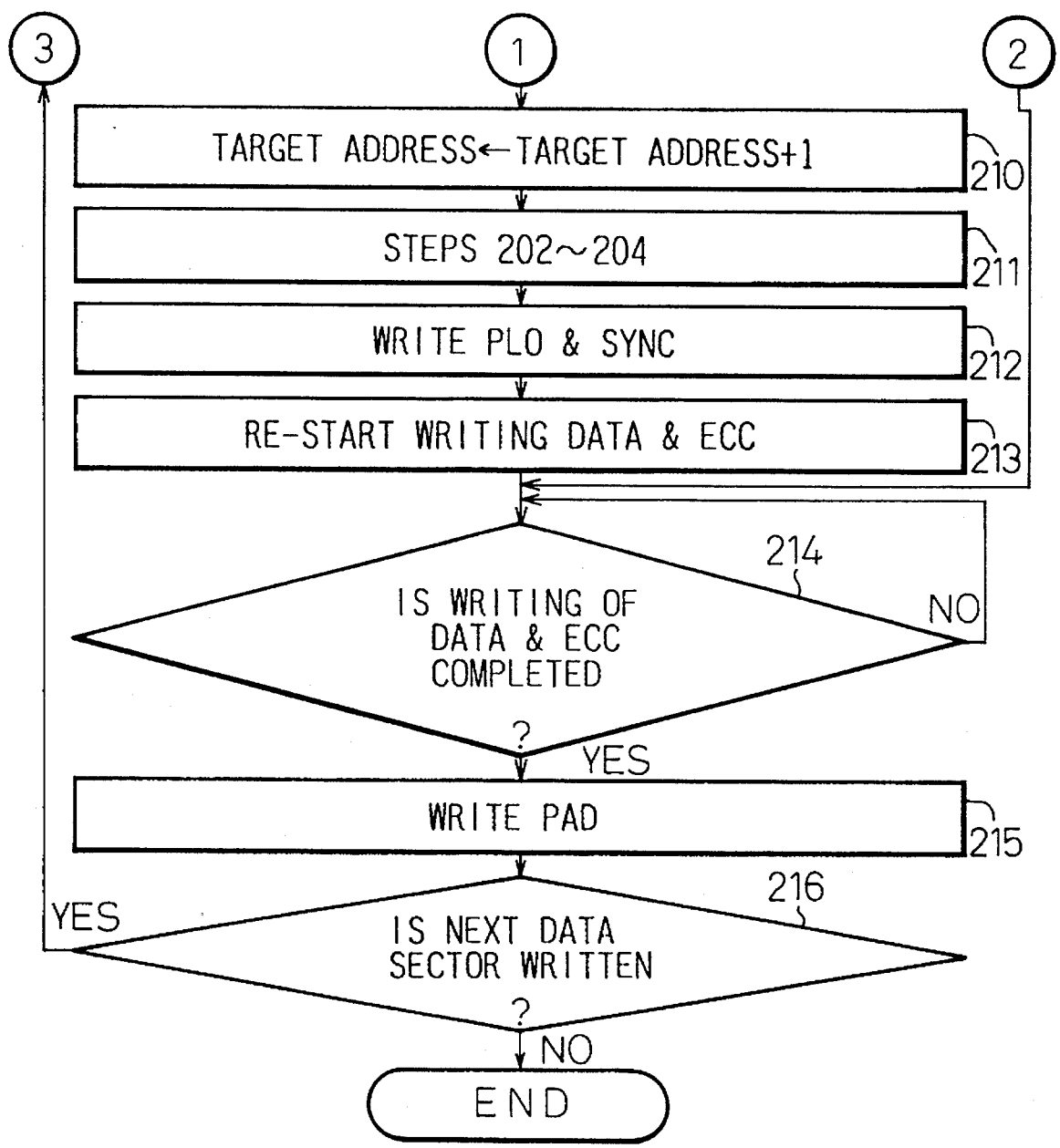

FIGS. 5a to 5c show a data structure in the portion P in FIG. 4 in enlarged scale on a time-sequential basis together with various control signals for use in reading data. FIGS. 6a to 6c show a data structure in portion P in FIG. 4 in enlarged scale on a time-sequential basis together with various control signals for use in writing data.

In FIGS. 5a to 5c, AGC denote a region corresponding to a period during which preparations are made for reading servo information. SM denotes a region in which a servo mark indicating the start of servo information is recorded. POSA to POSD denote regions in each of which position information for use in positioning a head is recorded. GAP denotes a gap region which is interposed between a servo information region and a data region and during of which corresponding period reversal of magnetization does not occur. PLO denotes a region during of which corresponding period a circuit is stabilized. SYNC denotes a region in which a synchronizing signal for use in reading data is recorded. DI denotes a region in which defect information is recorded. SI denotes a region in which split information is recorded. PAD denotes a region designed to prevent incorrect demodulation. ECC denotes a region in which an error check code for read data is recorded. ADDRESS denotes a servo address composed of a cylinder address and a sector address. DATA shown in FIGS. 5a and 5b denotes a first half or a second half of a region of data that has been split during constant density recording. Two DATA regions constitute a single data sector.

Alphabet T denotes a time interval of 62.5 nanoseconds (ns). B denotes data of one byte long. Tr denotes a time interval required until a Read Gated (RG) flag in a MPU 12 is turned on. Tdr1 denotes a time interval required for reading data of a certain length (equivalent to 200 bytes) written in split information SI. Tdr2 denotes a time interval required for reading data of a certain length (equivalent of 512 bytes minus Tdr1). (1) denotes timing of detecting a SYNC region. (2) denotes timing of reading a DI region. (3) denotes timing of reading a SI region.

A Servo Gated signal SG for use in reading servo information, a Read Gated signal RG, an Address Coincidence signal, and a SYNC Search signal are used as control signals.

In FIGS. 6a to 6c, Tw denotes a time interval required until a Write Gated flag in the MPU 12 is turned on. Tdw1 denotes a time interval required for writing data of a certain length (200 byte long) contained in a SI region. Tdw2 denotes a time interval required for writing data of a certain length (312 bytes long) obtained by calculating 512 bytes–Tdw1. (1) denotes timing of writing a SYNC region. (2) denotes timing of writing a DI region. (3) denotes timing of writing a SI region.

A Servo Gated signal SG for use in reading servo information, a Write Gated signal WG, and an Address Coincidence signal are employed as control signals. Other reference numerals have the same meanings as those in FIGS. 5a to 5c.

Referring to FIG. 2, a configuration of a magnetic disk drive unit in accordance with this embodiment will be described below.

In FIG. 2, reference numeral 12 denotes a microprocessor (MPU) for controlling the whole of the magnetic disk drive unit. The control given by the microprocessor 12 includes setup and control of control circuits (which will be described later), analysis and execution of a command sent from an external host system 60, control of a position of a voice coil motor (VCM), and control of rotation of a spindle motor (SPM). 14 denotes a read/write control circuit for controlling reading or writing of a data region on a track (cylinder) on a data surface of a magnetic disk. 16 denotes magnetic heads each of which is positioned on the opposite side of a data surface of a magnetic disk. 18 denotes a modulator that when a Write Gated (WG) signal sent from the read/write control circuit 14 has on voltage, modulates write data structured in a Non-return-to-Zero (NRZ) form into a 1/7 code and then outputs the 1/7 code. 20 denotes an amplifier for amplifying output data of the modulator 18 and supplies the amplified data as a record signal to a magnetic head 16. 24 denotes a demodulator that when a Read Gated (RG) signal sent from the read/write control circuit 14 has on voltage, demodulates a 1/7 reproduced signal provided by the amplifier 22 into NRZ data and then outputs the NRZ data. 26 denotes an interface control circuit for controlling transfer of commands, parameters, and read or write data to or from the host system 60. 28 denotes a data buffer for temporarily storing read or write data provided by the read/write control circuit 14 or interface control circuit 26. 30 denotes a buffer control circuit for controlling or managing the data buffer 28. 32 denotes an error check code (ECC) circuit for producing an ECC to be appended to write data (recorded signal), and checking if an error occurs in read data (reproduced signal) and correcting an error.

Reference numeral 34 denotes a servo mark detector for detecting a specific servo mark (servo reference information) written at the start of servo information. 36 denotes a timing generator for generating given timing information in response to a detected servo mark. 38 denotes an analog/digital (A/D) converter for reading (modulating) an amplitude of a burst used as position information and providing a digital signal. 42 denotes a digital/analog (D/A) converter for converting data used in positioning a head and produced by the MPU 12 into an analog signal. 44 denotes an amplifier for amplifying an analog output signal of the D/A converter 42 and supplying an amplified signal to the spindle motor 42 and voice control motor.

Reference numeral 46 denotes a bus over which the circuits are interconnected. In this embodiment, the MPU 12, read/write control circuit 14, modulator and demodulator 18 and 24, interface control circuit 26, buffer control circuit 30, ECC circuit 32, and servo mark detector 34 are interconnected over the bus 46.

The MPU 12 has a function of producing control data for use in positioning a magnetic head 16 on a desired track on the basis of a digital output of the A/D converter 38 and in compensating for a quantity of off-tracking; that is, an offset with respect to the center of a track. The produced data for use in positioning a head is supplied to the D/A converter 42 as mentioned above.

The read/write control circuit 14 includes a data control circuit 50, an address detector 52, an address comparator 54, and a timer 56. The data control circuit 50 executes data reading or writing in response to an Activate signal provided by the timer 56. To be more specific, for reading, the data control circuit 50 sets the Read Gated signal to on voltage in response to an Activate signal provided by the timer 56. The data control circuit 50 then detects a SYNC region succeeding a PLO region, and reads DI and SI regions. After analyzing the contents of the DI region to confirm that the servo sector concerned is not a defective region, the data control circuit 50 reads data according to the contents of the succeeding SI region. For writing, the data control circuit 50 sets the Write Gated signal to on voltage in response to an Activate signal provided by the timer 56, and sequentially writes the PLO, SYNC, DI, SI, and DATA regions.

The address detector 52 has a function of detecting a servo address (consisting of a cylinder address and a sector address) in servo information according to a Servo Mark Detected signal provided by the servo mark detector 34. The address comparator 54 compares a target servo address specified by the MPU 12 and a servo address detected by the address detector 52. When the addresses agree with each other, an Address Coincidence signal is supplied. The servo address detected by the address detector 52 is sensed by the MPU 12 via the address comparator 54 over the bus 46. The timer 56 starts counting in response to an Address Coincidence signal sent from the address comparator 54. When counting pulses for a period of time predetermined by the MPU 12, the timer 56 sends an Activate signal to the data control circuit 50.

Figure 3A:
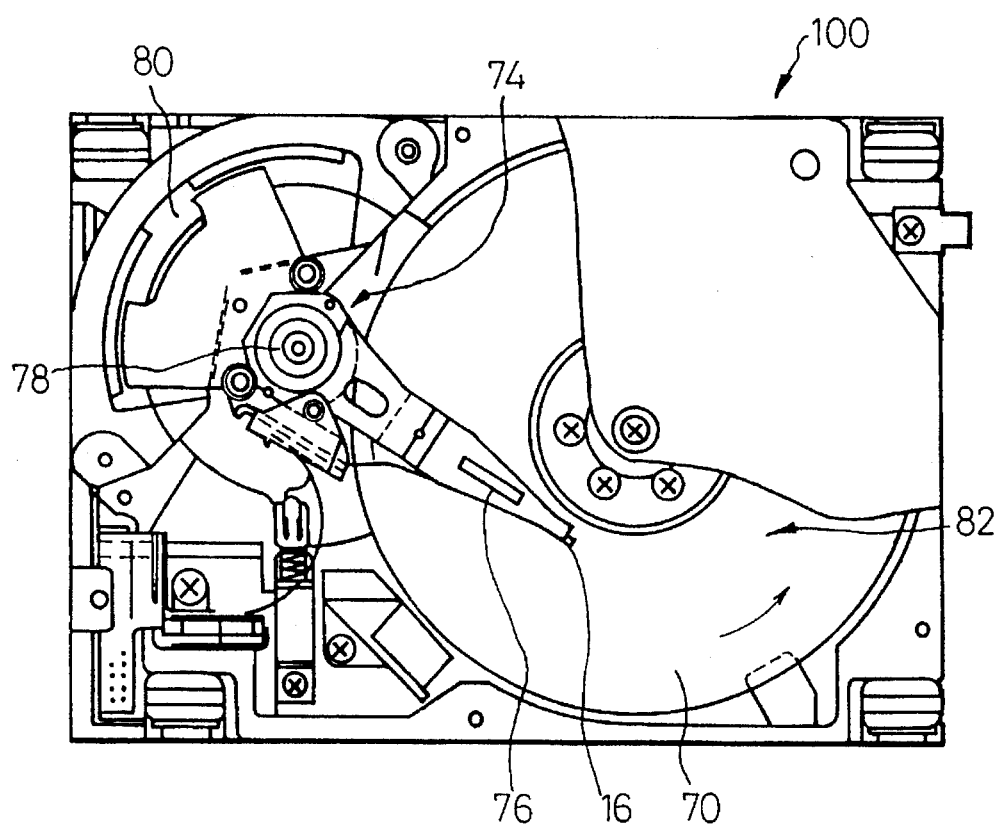
FIGS. 3a and 3b are views showing a structure of the magnetic disk drive unit shown in FIG. 2.
Figure 3B:
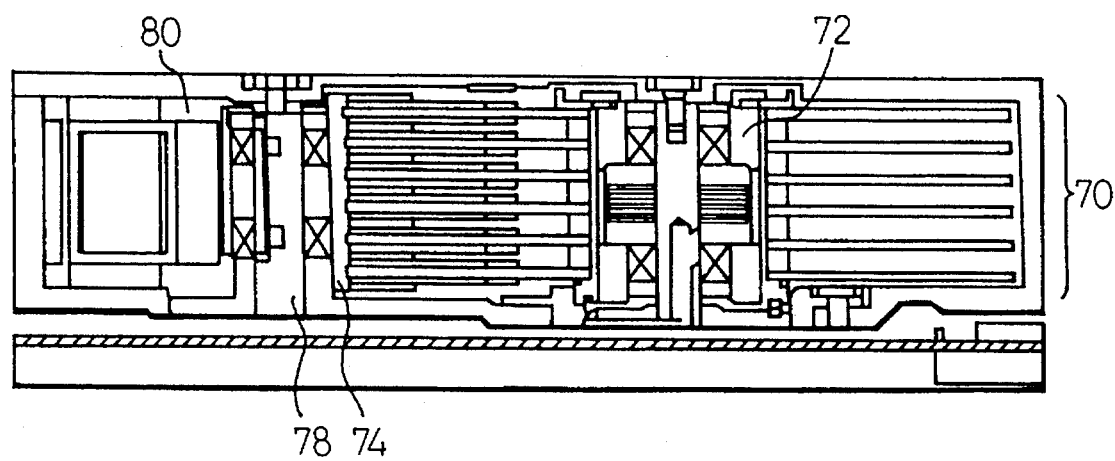

FIGS. 3a and 3b are a plan view and a cross-sectional view showing a structure of a magnetic disk drive unit in accordance with this embodiment.

In FIGS. 3a and 3b, a magnetic disk unit 70 is located inside a disk enclosure 100. In the example illustrated, six magnetic disks 70 (See FIG. 3b) are incorporated so that they can be rotated by means of a disk rotation unit 72. Sliders (recording/reproducing magnetic heads 16) are attached to the tips of arms 76 of a head actuator 74. With a shaft 78 as a center, the head actuators 74 is driven by a voice coil motor 80. On each of the surfaces of the magnetic disks 70, a plurality (1300 in this embodiment) of tracks 82 (associated with cylinders) on which data streams having the data structure shown in FIGS. 5a to 6c are formed concentrically.

Next, an example of reading or writing to be executed by the magnetic disk drive unit of this embodiment will be described with reference to the flowcharts of FIGS. 7a, 7b, 8a, and 8b as well as FIGS. 5a to 6c.

(a) Reading (See FIGS. 7a, 7b, and 5a to 5c.)

First of all, at step 101, a servo address (target servo address) written immediately before a data sector to be read is specified in the address comparator 54. At step 102, servo information is detected and modulated. Specifically, a servo mark (servo reference information) is detected, a cylinder address is modulated, position information is modulated, and then a sector address is modulated. A head is thus positioned.

At step 103, it is determined whether a detected address agrees with a target servo address. If the result of determination is in the affirmative, control is passed to step 104. If the result of determination is in the negative, control is returned to step 102. When the result of determination is in the affirmative, the address comparator 54 transmits an Address Coincidence signal to the timer 56. In response to the Address Coincidence signal, the timer 56 sends an Activate signal to the data control circuit 50. At step 104, the data control circuit 50 responds to the Activate signal, stands by for a period of time required until a PLO region of target data starts (time interval Tr required until an RG signal has on voltage), turns on a Read Gated flag, and thus starts reading the PLO region.

At step 105, it is determined whether a SYNC region is detected. If the result of determination is in the affirmative, control is passed to step 106. If the result of determination is in the negative, control is returned to step 105. Determination is then rerun. At step 106, the data control circuit 50 reads DI and SI regions. At step 107, reading of DATA and ECC regions is started.

At step 108, it is determined whether data split occurs. If the result of determination is in the affirmative, control is passed to step 109. If the result of determination is in the negative, control is passed to step 114. At step 109, it is determined whether a position of data split has come. If the result of determination is in the affirmative, control is passed to step 110. If the result of determination is in the negative, control is returned to step 109. Determination is then rerun. At step 110, reading of the DATA and ECC regions is suspended. At step 111, a current target servo address is incremented by one and regarded as a new target servo address. At step 112, the processing of step 102 to 105 is rerun. At step 113, reading of the DATA and ECC regions is restarted.

At step 114, it is determined whether reading of the ECC region and a PAD region is completed. If the result of determination is in the affirmative, control is passed to step 115. If the result of determination is in the negative, control is returned to step 114. Determination is then rerun. At step 115, it is determined whether the next data sector should be read. If the result of determination is in the affirmative, control is returned to step 104. The foregoing processing is then rerun. If the result of determination is in the negative, this sequence terminates.

(b) Writing (See FIGS. 8a, 8b, and 6a to 6c.)

First of all, at step 201, a servo address written immediately before a data sector to be written (target servo address) is specified in the address comparator 54. At step 202, servo information is detected and modulated (a servo mark is detected, and a cylinder address is modulated, position information is modulated, and a sector address is modulated). Thus, a head is positioned.

At step 203, it is determined whether a detected address agrees with the target servo address. If the result of determination is in the affirmative, control is passed to step 204. If the result of determination is in the negative, control is returned to step 202. When the result of determination is in the affirmative, the address comparator 54 sends an Address Coincidence signal to the timer 56. In response to the Address Coincidence signal, the timer 56 sends an Activate signal to the data control circuit 50. At step 204, the data control circuit 50 responses to the Activate signal, and stands by for a period of time required until a PLO region of target data starts (for a time interval required until a WG signal has on voltage). At step 205, the Write Gated flag is turned on and the PLO, SYNC, DI, and SI regions are written. At step 206, the data control circuit 50 starts writing DATA and ECC regions.

At step 207, it is determined whether data split occurs. If the result of determination is in the affirmative, control is passed to step 208. If the result of determination is in the negative, control is passed to step 214. At step 208, it is determined whether a position of data split has come. If the result of determination is in the affirmative, control is passed to step 209. If the result of determination is in the negative, control is returned to step 208. Determination is then rerun. At step 209, writing of the DATA and ECC regions is suspended.

At step 210, the current target servo address is incremented by one and regarded as a new target address. At step 211, the aforesaid processing of steps 202 to 204 is rerun. At step 212, the PLO and SYNC regions are written. At step 213, writing of the DATA and ECC regions is restarted.

At step 214, it is determined whether writing of the DATA and ECC regions is completed. If the result of determination is in the affirmative, control is passed to step 215. If the result of determination is in the negative, control is returned to step 214. Determination is then rerun. At step 215, a PAD region is written. At step 216, it is determined whether the next data sector should be written. If the result of determination is in the affirmative, control is returned to step 204. The aforesaid processing is then rerun. If the result of determination is in the negative, the sequence terminates.

As described above, in the magnetic disk drive unit of this embodiment, when data reading or writing is executed for any data sector (data region succeeding servo information), first of all, a servo address (composed of a cylinder address and a sector address) is retrieved from servo information preceding the data sector concerned. In case retrieval succeeds, after a given period of time (time interval Tr for reading, and a time interval Tw for writing) has elapsed since the time of retrieval, when reading is to be performed, a SYNC region is retrieved. Thereafter, when DI and SI regions are appended, the information in these regions is used to execute reading.

For writing, similarly for reading, first, a servo address is retrieved from servo information preceding a data sector concerned. When retrieval succeeds, after a given time interval Tw has elapsed since the time of retrieval, PLO and SYNC regions are written and DI and SI regions are also written if necessary. DATA and additional DATA regions are then written.

In the aforesaid process of reading or writing, if retrieval of a servo address from servo information preceding a data sector concerned fails, a servo address immediately preceding the target servo address of which retrieved has failed is detected. When a period of time comparable to a servo period has elapsed since the time of detection, it is assumed that the target servo address is available, a start position of data processing is determined with the detected servo address as a reference. Reading or writing can thus be executed for the data sector concerned.

Since DI and SI regions are interposed between SYNC and DATA regions (See FIGS. 5 to 8), a function of replacing a data sector with another sector and a function of performing constant density recording can be implemented in the same manner as those in a conventional drive unit. When these functions need not be implemented in a drive unit, the DI and SI regions may, needless to say, be omitted.

According to a data structure employed in this embodiment (See FIGS. 4 to 8), DATA ID, GAP, and PAD regions that are included in a conventional data sector are discarded. This leads to a 3 to 5% increase in storage capacity.

To be more specific, the magnetic disk drive unit of this embodiment can reduce an amount of data by 20 to 30 bytes (GAP region: several bytes, PLO region: about ten bytes, ID region: six to eight bytes, PAD region: one to two bytes) for each sector (block). The resultant amount of data ranges from 558 to 568 bytes (GAP region: 20 to 30 bytes, PLO region: about ten bytes, DATA region (including DI, SI, and ECC regions): 526 bytes, PAD region: two bytes).

Although the present invention has been disclosed and described by way of one embodiment, it is apparent to those skilled in the art that other embodiments and modifications of the present invention are possible without departing from the essential features thereof.

What is claimed is:

1. A magnetic disk drive unit using a data surface servo system, comprising:

at least one magnetic disk having a data surface, said data surface having servo regions in which servo information including a servo address for use in positioning a head is written and succeeding data regions, said servo regions and said data regions being arranged alternately on each of a plurality of tracks sectored radially on said data surface;

a magnetic head facing said data surface for recording or reproducing data to or from said data surface;

modulating/demodulating means for modulating write data to supply as a record signal to said magnetic head, and for demodulating signals reproduced by said magnetic head to output demodulated signal as read data; and read/write control means for controlling read/write processing of data using said magnetic head and said modulating/demodulating means;

said servo address being composed of a cylinder address indicating a cylinder associated with a corresponding one of said plurality of tracks and a sector address indicating a corresponding one of a plurality of sectors sectioned along the circumference of said data surface; and said read/write control means including means for detecting a servo address included in said servo information, and means for determining a position of a target data region according to the detected servo address, and executing a read/write processing of data for the determined data region; wherein said means for determining a position of a target region comprises means for comparing a predetermined target servo address with said detected servo address, and when a result of the comparison demonstrates that both the addresses coincide with each other said means for determining a position of a target data region executes, after a given time period has elapsed, a read/write processing of data for the determined data region; and said means for determining a position of a target data region further comprises means for counting pulses for said given time period in response to a signal from said address comparing means indicating that both the addresses coincide.

2. A magnetic disk drive unit using a data surface servo system, comprising:

at least one magnetic disk having a data surface, said data surface having servo regions in which servo information including a servo address for use in positioning a head is written and a succeeding data regions, said servo regions and said data regions being arranged alternately on each of a plurality of tracks sectored radially on said data surface;

a magnetic head facing said data surface for recording or reproducing data to or from said data surface;

modulating/demodulating means for modulating write data to supply as a record signal to said magnetic head, and for demodulating signals reproduced by said magnetic head to output demodulated signal as read data; and read/write control means for controlling read/write processing of data using said magnetic head and said modulating/demodulating means;

said servo address being composed of a cylinder address indicating a cylinder associated with a corresponding one of said plurality of tracks and a sector address indicating a corresponding one of a plurality of sectors sectioned along the circumference of said data surface; and said read/write control means including means for detecting a servo address included in said servo information, and means for determining a position of a target data, region according to the detected servo address, and executing a read/write processing of data, for the determined data region; wherein said means for determining a position of a target region comprises means for comparing a predetermined target servo address with said detected servo address, and when a result of the comparison demonstrates that both the addresses coincide with each other said means for determining a position of a target data region executes, after a given time period has elapsed, a read/write processing of data for the determined data region; and when said target servo address cannot be detected directly from said servo information, said means for determining a position of a target data region determines said target servo address by waiting a time equal to a servo period after a servo address immediately preceding said target servo address was detected, and executes a read/write processing based upon the determined target servo address.

3. The magnetic disk drive unit according to claim 2, wherein said data surface includes:

a synchronization information region having synchronization information for use in reading or writing, and a split information region, interposed between said synchronization information region and a succeeding data region, having split information indicating occurrence of data split resulting from constant density recording.

4. The magnetic disk drive unit according to claim 2, wherein said data surface includes:

a synchronization information region having synchronization information for use in reading or writing, and a defect information region, interposed between said synchronization information region and a succeeding data region, having defect information indicating presence or absence of a defect in said data region.

* * * * *